US005944119A

United States Patent [19]

Hsieh

[11] Patent Number: 5,944,119

[45] Date of Patent: Aug. 31, 1999

[54] GRIP STRUCTURE FOR A PNEUMATIC TOOL

[76] Inventor: Yu-Fu Hsieh, P.O. Box 96-405, Taipei 10098, Taiwan

[21] Appl. No.: 09/061,117

[22] Filed: Apr. 16, 1998

[51] Int. Cl.$^{6}$ .................... B23B 45/00

[52] U.S. Cl. .................... 173/170; 173/169; 173/93.5; 173/DIG. 2

[58] Field of Search .................... 173/218, 219, 173/170, 169, 168, 93, 93.5, 216; 251/39

[56] References Cited

U.S. PATENT DOCUMENTS

| | | | |
|---|---|---|---|
| 3,908,768 | 9/1975 | Hess | 173/93 |
| 4,217,964 | 8/1980 | Eaton | 173/216 |
| 5,022,469 | 6/1991 | Westerberg | 173/DIG. 2 |
| 5,346,024 | 9/1994 | Geiger et al. | 173/221 |
| 5,591,070 | 1/1997 | Kachich | 173/221 |
| 5,626,198 | 5/1997 | Peterson | 173/93 |
| 5,797,462 | 8/1998 | Rahm | 173/169 |
| 5,836,401 | 11/1998 | Hsiu-Tsu | 173/93 |

*Primary Examiner*—Peter Vo
*Assistant Examiner*—James P Calve

[57] ABSTRACT

An improved grip structure for a pneumatic tool, in which the grip is furnished with a valve seat mounted with a control valve; the central part of the valve seat has an intake passage, of which the outer end is connected with an intake connector, the valve seat and a ring-shaped groove of the bearing-block hole in the dynamic housing are connected and communicated each other by means of an intake passage. Two symmetrical exhaust passages are furnished on both sides of the valve seat, and extended from the outer end of the grip to the ring-shaped groove of the bearing-block hole in the dynamic housing; a pressure air can enter a central intake passage, flowing through the control valve and a side intake passage, and finally flowing into the ring-shaped groove in the dynamic housing so as to drive blades and a rotor to turn; then, the pressure air will be exhausted through the ring-shaped groove of the cylinder sleeve and the two exhaust passages so as to provide a better intake and exhaust passages for the pneumatic tool.

1 Claim, 3 Drawing Sheets

GRIP STRUCTURE FOR A PNEUMATIC TOOL

BACKGROUND OF THE INVENTION

1. Field of the Invention

This invention relates to a pneumatic tool, and particularly to a grip structure for a pneumatic tool with better intake and exhaust functions.

2. Description of the Prior Art

Generally, every pneumatic tool is finished with a driving force by means of a pressure air to enter a dynamic housing to drive a rotor and blades therein; then, the pressure air used will be exhausted via an exhaust hole of a cylinder sleeve. As long as the compressed air enters the dynamic housing continuously, the blades and the rotor will turn continuously to actuate a spindle to turn so as to have a tool work as desired.

In a conventional pneumatic tool, a pressure air is usually introduced, via a suitable passage, into a connector member; a control valve in the tool is used for controlling the pressure air to flow into the dynamic housing of the tool so as to drive blades and a rotor therein to turn; the rotor will drive a tool to turn or to move back and forth to fulfil a work. The performance of the blades and the rotor in the dynamic housing can not be perfect before having a perfect intake control assembly, intake passage and exhaust passage furnished for the dynamic housing, i.e., only when the aforesaid parts are perfectly designed, the tool can provide a perfect output.

In conventional pneumatic tool, the dynamic housing of the rotor and blades is usually combined with the cock grip together into one piece; the intake connector is directly connected, by means of threads, with the intake end of the dynamic housing. After the rotor and the blades in the cylinder sleeve are driven to turn by means of pressure air, the air will be exhausted out via the exhaust passage of the dynamic housing; such conventional pneumatic tool is referred to as a front exhaust type of tool, and it will result a considerable noise during operation. In another type of tool, there is a passage furnished between the inner wall of the dynamic housing and the cylinder sleeve, and such passage can have the exhaust passage extend to the rear end of the control valve so as to facilitate the air to exhaust into the atmosphere; instead, the end of the grip may be connected with an outer pipe, by which the air exhausted can flow out of the tail end of the outer pipe so as to reduce the exhausting noise; however, the pneumatic tool connected with an outer pipe might affect the tuning speed of the rotor in case of the intake passage and the exhaust passage being not installed properly because of the air unable to exhaust out smoothly.

SUMMARY OF THE INVENTION

The prime object of the present invention is to provide a grip structure for a pneumatic tool, in which the dynamic housing and the grip are molded integrally together, being arranged each other at a given angle; the inner bearing-block hole in the dynamic housing has a ring-shaped groove, which is connected with an intake passage in communication with the valve seat; two symmetrical exhaust passages are furnished beside both sides of the valve seat and from the tail end of the grip to the bearing-block hole in the dynamic housing; an intake connector is provided between the two symmetrical exhaust passages, and connected with the valve seat. By means of a control valve operated with a cock, the pressure air can flow, through the valve seat and an intake passage beside the grip, into the cylinder sleeve of the dynamic housing so as to drive the blades and a rotor to turn; then, the pressure air will flow through the two symmetrical exhaust passages and the outer pipe connected with the grip to exhaust out.

Another object of the present invention is to provide a grip structure for a pneumatic tool, in which the lower end of the grip is mounted with a valve seat perpendicular to the grip, and the valve seat is installed with a control valve for controlling the flow of pressure air. The grip is furnished with two symmetrical exhaust passages on both sides of the valve seat, and such exhaust passages extend from the valve seat to the ring-shaped groove of the bearing-block hole in the dynamic housing so as to have the pressure air exhausted out.

Still another object of the present invention is to provide a grip structure for a pneumatic tool, in which an intake passage is furnished in the central part of the grip, and extended from the valve seat to the end of the grip. The outer end of the intake passage has a threaded hole to facilitate connecting with an intake connector, which is then connected with a pressure-dividing ring of the outer pipe by means of a cylindrical hole.

A further object of the present invention is to provide a grip structure for a pneumatic tool, in which an intake passage is furnished on one side of the grip, and extended from the valve seat to the dynamic housing; the lower end thereof under the valve seat is sealed with an end plug. Under the control of the control valve, the pressure air can flow, through the intake passage, into the cylinder sleeve in the dynamic housing.

A still further object of the present invention is to provide a grip structure for a pneumatic tool, in which the tail end of the grip has a cylindrical hole to be connected with the outer pipe, which is attached with a pressure-dividing ring covered with muffling cotton; the pressure air exhausted out of the pneumatic tool can flow out of the exhaust passage, the pressure dividing ring and the outer pipe directly.

DETAILED DESCRIPTION OF THE PREFERRED EMBODIMENT

Figure 1:
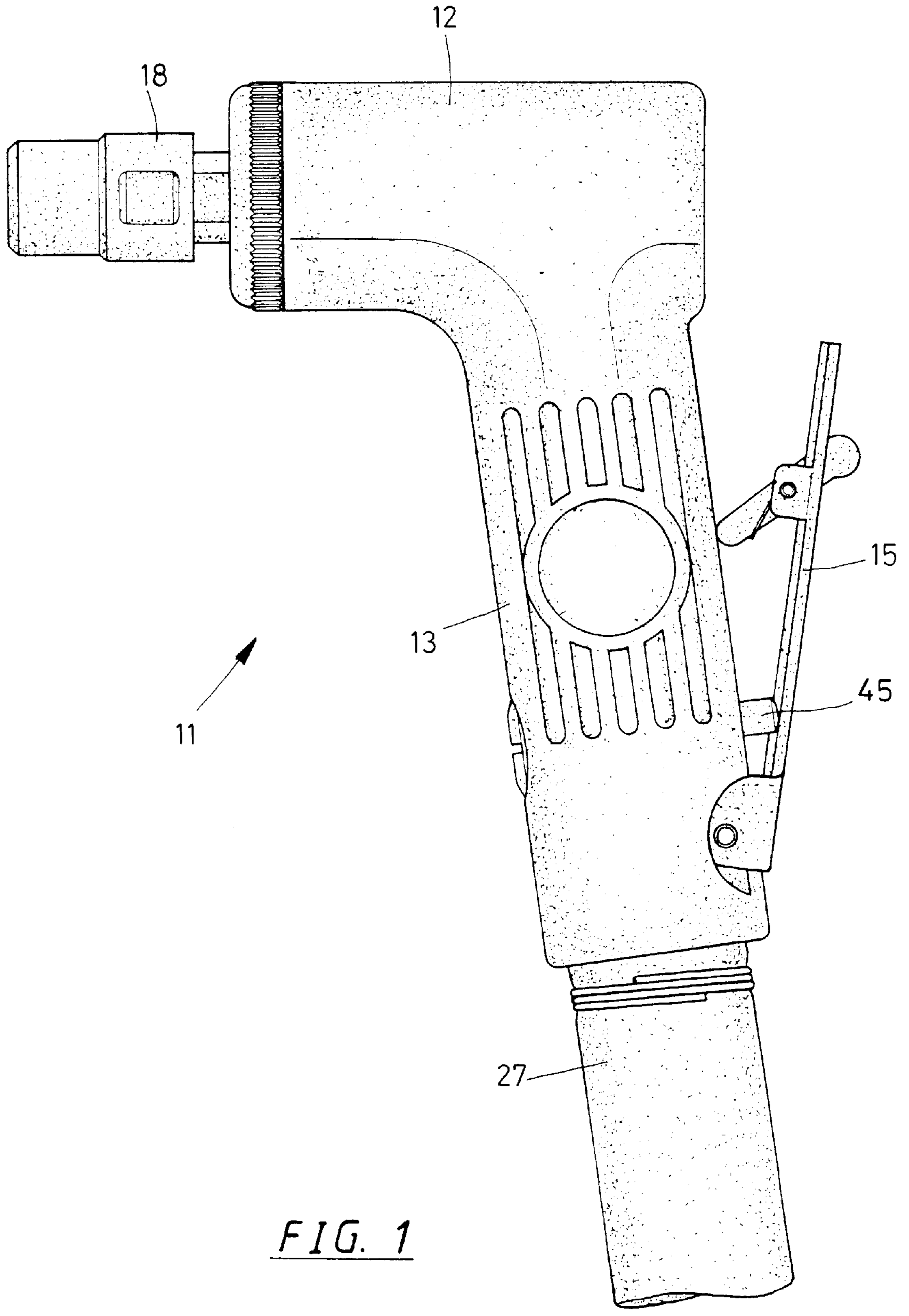
FIG. 1 is a plan view of the present invention.
Figure 2:
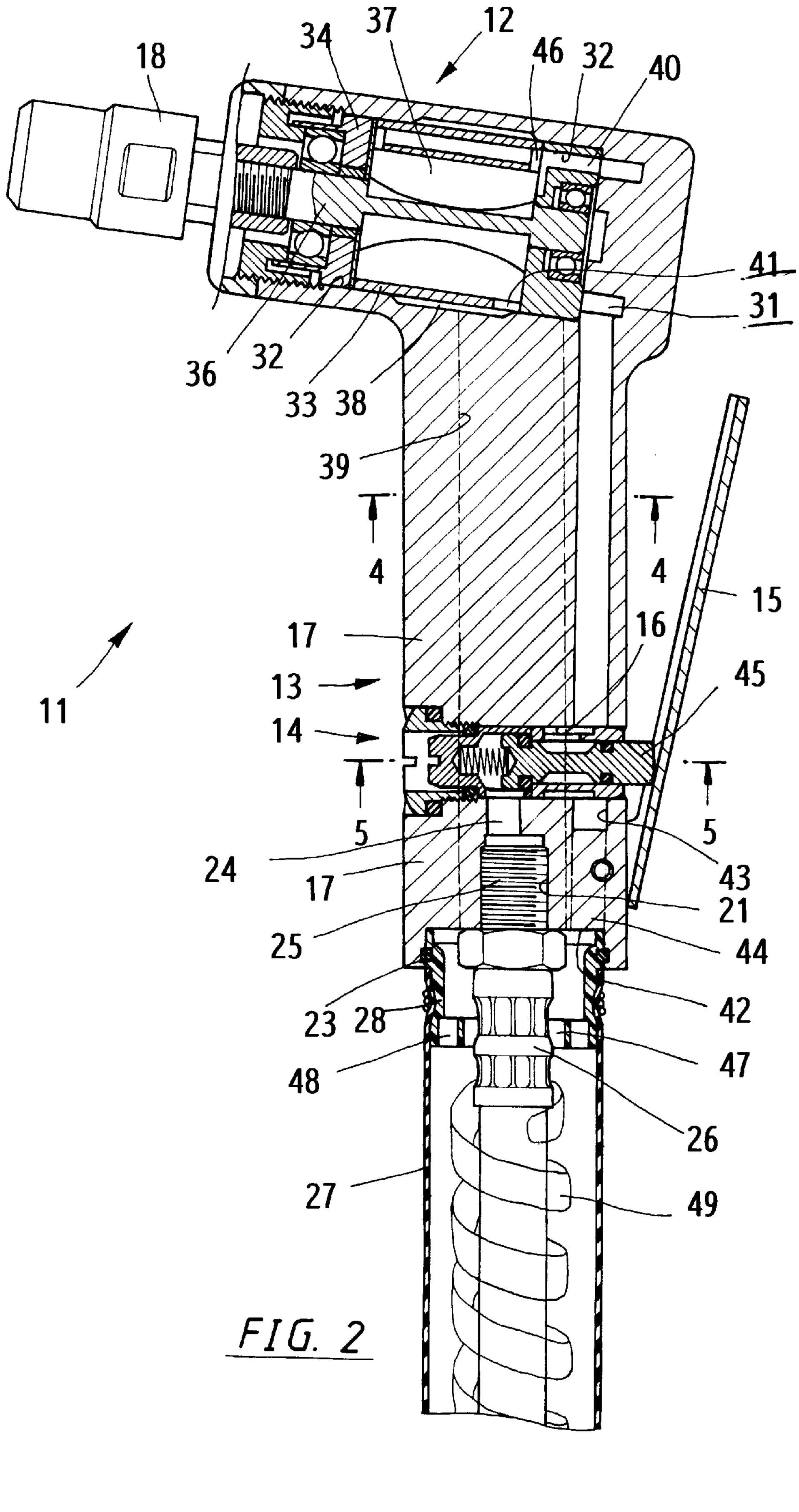
FIG. 2 is a sectional view of the present invention, showing the assembled relation of parts thereof.
Figure 3:
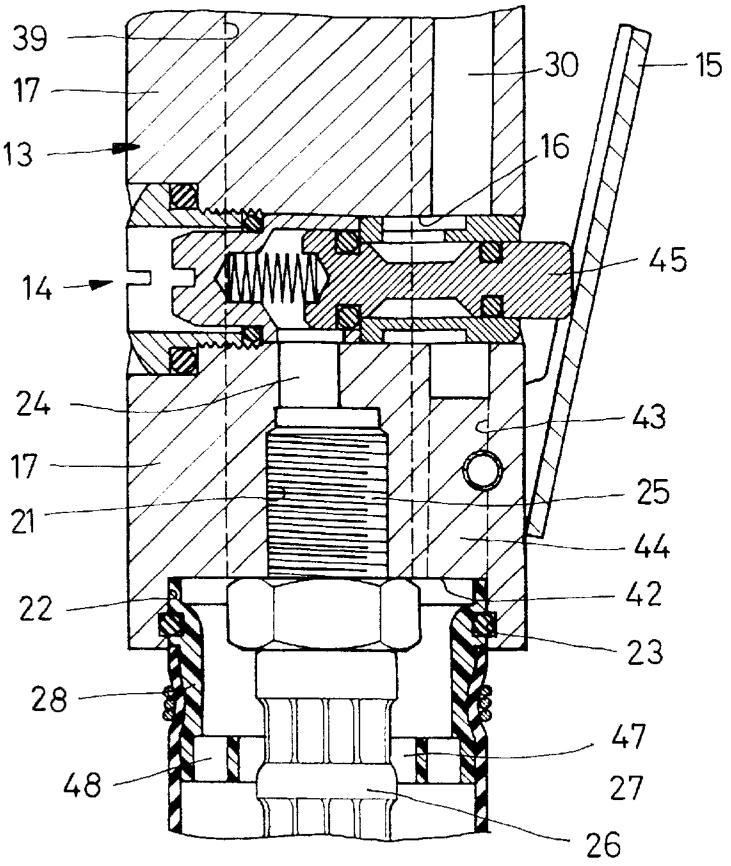
FIG. 3 is a sectional view of the present invention, showing the structure of the grip portion thereof.
Figure 4:
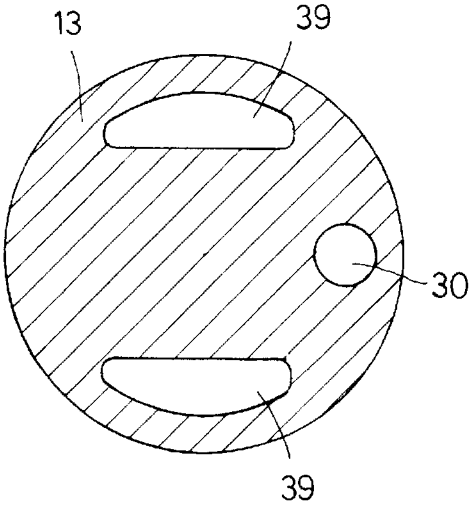
FIG. 4 is a sectional view of the present invention taken along line 4—4 in FIG. 2.
Figure 5:
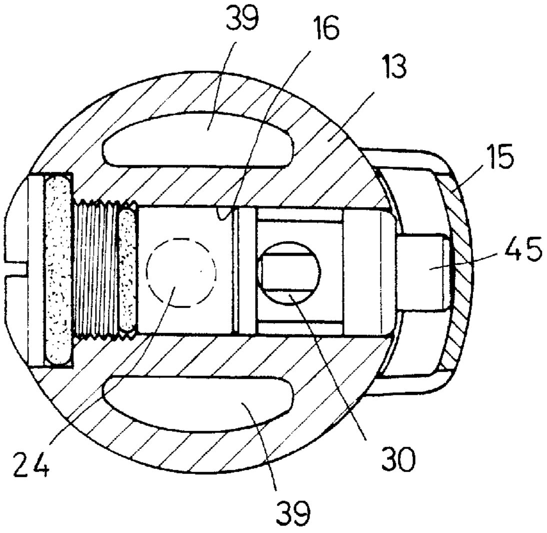
FIG. 5 is a sectional view of the present invention take along line 5—5 in FIG. 2.

Referring to FIGS. 1 to 5, the present invention relates to an embodiment of an improved grip structure for a pneumatic tool; the front end of the dynamic housing 12 of the pneumatic tool 11 is to be mounted with a tool 18; during operation, the spindle of a tool 18 is directly coupled with a rotor 36 in the dynamic housing 12. The rotor 36 is driven to turn at a high speed through blades 37 upon a pressure air being applied to the blades 37 so as to let the tool 18 work as desired.

The rotor 36 and the blades 37 in the dynamic housing 12 are fastened between two bearing blocks 34, between which a cylinder sleeve 33 is mounted. A pressure air is to be introduced through an intake passage 30 to flow through a ring-shaped groove 31 on bottom of the bearing-block hole 32, and an intake hole 40 of the bearing block 34; finally, the pressure air enters the cylinder sleeve 33 to drive the blades 37 and to actuate the rotor 36 to turn. After driving the blades 37, the pressure air will flow into the exhaust passage 39 on two opposite sides of the grip 13 via the exhaust hole 41 and a ring-shaped groove 38 on the cylinder sleeve 33. After the blades 37 are driven to turn with the pressure air, they will actuate the rotor to turn at a high speed. If the exhaust passage 39 is not furnished properly, or not exhausting smoothly, some of the pressure air will be blockaded.

The housing 12 extends from the outer surface of the cylinder sleeve 33 at a given angle to form into the grip 13; the grip 13 is mounted with a valve seat 16 perpendicular to and through the grip, and a control valve 14 is fitted in the valve seat 16. The mid-section of the grip 13 is furnished with an intake passage 24 in communication with the valve seat 16; the outer end of the intake passage 24 is furnished with a threaded hole 21 for receiving an intake connector 25 of an intake pipe 26.

Between one side of the valve seat 16 and the ring-shaped groove 31 in the bearing-block hole 32 of the dynamic housing 12, there is an intake passage 30. The intake passage 30 extends from an end flat surface 42 of the cylindrical hole 22 in the grip 13 to a ring-shaped groove 31 under the bearing-block hole 32 in dynamic housing 12; it is substantially an elongate cylindrical hole 43, of which one end is closed with a pin 44, i.e., that end is a sealed end.

The center of one end of the grip 13 has a threaded hole 21 for receiving an intake connector 25 of the intake pipe 26 so as to have the pressure air flowed into the valve seat 16 directly. In order to control the pressure air, the valve seat 16 is mounted with a control valve 14, of which the valve rod 45 extends out of the grip 13, being connected with a rod-shaped cock 15. The control valve 14 has a passage in communication with two intake passages 24 and 30. The opening size of the aforesaid passage is to be controlled with the cock 15 to press the valve rod 45 so as to adjust the flow of the pressure air in order to control the turning speed of the rotor 36 in the dynamic housing 12.

The outer end of the intake passage 24 in the grip 13 has a threaded hole 21 to connect with the intake connector 25 of the intake pipe 26. Pressure air flows out of a compressor and then flows through the intake pipe 26 to enter the intake passage 24 in the grip 13; the control valve 14 is used for controlling the flow of pressure air. The outer end of the threaded hole 21 in the grip 13 is furnished with a cylindrical hole 22, of which the surface has a ring-shaped groove 23 to facilitate mounting a pressure-dividing ring 28 of an outer pipe 27, and then it is connected together with the cylindrical hole 22 at one end of the grip 13.

The dynamic housing 12 has an elongate bearing-block hole 32, of which the bottom is furnished with a ring-shaped groove 31; the center part of the bearing-block hole 32 has a ring-shaped groove 38 with large diameter. The rotor 36 and the blades 37 are positioned in a space between the two bearing blocks 34. The rotor 36 is mounted with a cylinder sleeve 33, which has an exhaust hole 41 in communication with the ring-shaped groove 38, and the groove 38 is in communication with the exhaust passage 39 in the grip 13. The cylinder sleeve 33 has an intake hole 46 in communication with an intake hole 40 of the bearing block 34; further, the intake hole 40 of the bearing block 34 is in communication with the ring-shaped groove 31 under the bearing-block hole 32 of the dynamic housing 12. The pressure air controlled with the cock 15 can flow through the intake passage 30, the ring-shaped groove 31 of the dynamic housing 12, and the intake hole 40 of the bearing block 34 to enter the cylinder sleeve 33; then, the pressure air will drive the blades 37 and the rotor 36 to turn, and then will be exhausted via an exhaust hole 41 furnished in the cylinder sleeve 33. The air exhausted will flow out through the ring-shaped groove 38 of the cylinder sleeve 33, the exhaust passage 39 in communication with the groove 38 and the pressure-driving ring 28 and an outer pipe 27.

The central part of the bearing-block hole 32 that is adjacent to the dynamic housing 12 has a ring-shaped groove 38 with a larger diameter; both sides of the grip 13 are furnished with two symmetrical exhaust passages 39. The exhaust passages 39 on both sides of the valve seat 16 have a considerable distance from the two intake passages 24 and 30, i.e., without disturbing each other. The two symmetrical exhaust passages 39 extend from the ring-shaped grooves 38 to the end flat surface 42 of the grip 13, and they are used for draining the pressure air to the pressure-dividing ring 28 and the outer pipe 27 connected with the grip 13.

Under the cock 15, the threaded hole 21 in the center of the end flat surface 42 and the cylindrical hole 22 are used for connecting the intake connector 25 of the intake pipe 26, and for positioning the pressure-dividing ring 28 respectively; the intake pipe 26 and the pressure dividing ring 28 are separate parts to be mounted in place respectively. The outer surface of the pressure-dividing ring 28 has an outer groove to fasten one end of the outer pipe 27 by using a pipe clip for positioning. The inner surface of the pressure/dividing ring 28 has an inner ring-shaped passage 47, of which the outer surface is mounted with a pressure-dividing plate 48. The intake pipe 26 passes through the inner ring-shaped passage 47, and the intake connector 25 is connected with the threaded hole 21. From the outer end of the pressure-dividing ring 28, the intake pipe 26 is wrapped up with muffling cotton 49, which is within the outer pipe 27.

During the pneumatic tool being in operation, the intake pipe 26 is connected with a compressor, and the pressure air will flow through the control valve 14 and the intake passage 30 on one side of the grip 13 to enter the ring-shaped groove 31 on bottom of the bearing-block hole 32 in the dynamic housing 12, and then flows through the intake hole 40 of the bearing block 34, the intake hole 46 and the cylinder sleeve 33 so as to drive the blades 37 and the rotor 36 to turn and to have the tool 18 work. After the pressure air flows, through the control valve 14, into the cylinder sleeve 33, it will flow, through the exhaust hole 41 of the cylinder sleeve 33, into the ring-shaped groove 38; then, it will flow through the symmetrical exhaust passages 39, the pressure-dividing ring 28 on the tail end of the grip 13; by means of the pressure-dividing plate 48, vibration can be reduced, and then it flows to the tail end of the outer pipe 27. As soon as the air flows through the pressure-dividing plate 48 of the pressure-dividing ring 28 and the pipe wrapped up with muffling cotton 49, the exhaust noise will be lowered considerably.

According to the present invention, the grip 13 and the dynamic housing 12 are molded integrally; the grip casing 17 of the grip 13 is furnished with intake passages 24 and 30. The flow of pressure air is to be controlled with the valve rod 45 of the control valve 14. After the pressure air drives the rotor 36 to turn, the air will flow via the wide exhaust passage 39, which can have the pressure air exhausted smoothly through the exhaust hole 41 of the cylinder sleeve 33 so as to enable the tool 11 to work efficiently.

The aforesaid description of the embodiment according to the present invention has completely disclosed the features and structure thereof, and it is apparent that the tool in the present invention has a quite improvement, which is not anticipated and attained by those who work in the same field; therefore, the structure thereof is deemed unique.

What is claimed is:

1. An improved grip structure for a pneumatic tool, of which a dynamic housing and a grip molded integrally as one piece; said dynamic housing and said grip are formed at a related given angle; a front end of said dynamic housing having a bearing-block hole, and a bottom of said bearing-block hole having a ring-shaped groove; a mid-section of said bearing-block hole finished with a ring-shaped groove having a larger diameter; a rear portion of said grip furnished with a valve seat being perpendicular to said grip; said valve seat mounted with a control valve to control flow of pressurize air, and features of said improved grip structure described as follows:

one end of said grip furnished with an intake passage extended to said valve seat; outer end of said intake passage furnished with a threaded hole for connecting an intake connector; a cylindrical hole extending from an end flat surface of said grip to said intake passage in communication with said ring-shaped groove on the bottom of said bearing-block hole of said dynamic housing; one end of said intake passage on said end flat surface being sealed with a pin to have said one end formed into a sealed flat surface; two symmetrical exhaust passages furnished in said grip and on both sides of said valve seat, and said two exhaust passages extended from said end flat surface to said ring-shaped groove in said dynamic housing; said end flat surface of said grip furnished with a cylindrical hole having a suitable length and said cylindrical hole to be connected with a pressure-dividing ring of an outer pipe; a threaded hole in a center of said end flat surface of said grip being connected with an intake connector of said intake pipe by means of said control valve in said valve seat, pressurize air is able to flow, through said intake passage, into said ring-shaped groove under said bearing-block hole of said dynamic housing, and then pressurize flow air is able to through said bearing block and an intake hole of said cylinder sleeve, and finally entering said cylinder sleeve directly so as to drive said blades and said rotor; after said pressurized air drives said rotor, said pressure air being exhausted swiftly into said ring-shaped groove outside of said cylinder sleeve, and through said symmetrical exhaust passages, and finally flowing to said pressure-dividing ring and said outer pipe on tail end of said grip.

* * * * *